Jan. 24, 1961    S. G. V. STENUDD    2,969,498
ELECTRIC CONTROL DEVICE FOR THE CONTROL
OF ELECTRIC VOLTAGE OR CURRENT
Filed Sept. 23, 1957    2 Sheets-Sheet 1

INVENTOR:
Sven Gunnar Valter Stenudd

BY:
Pierce, Scheffler & Parker
ATTORNEYS.

ively the same as when a thyratron is used.

United States Patent Office
2,969,498
Patented Jan. 24, 1961

2,969,498

ELECTRIC CONTROL DEVICE FOR THE CONTROL OF ELECTRIC VOLTAGE OR CURRENT

Sven Gunnar Valter Stenudd, Stuvsta, Sweden, assignor to Atvidabergs Industrier, Atvidaberg, Sweden, a Swedish joint-stock company Filed Sept. 23, 1957, Ser. No. 685,525

Claims priority, application Sweden Sept. 25, 1956

5 Claims. (Cl. 323—22)

The present invention relates to a device for keeping constant or controlling in some other way an electrical voltage or current. Examples of such devices are stabilized D.C. voltage units which occur on the market. The controlling means usually consists of a transductor, a thyratron, a vacuum tube or a transistor.

In all these cases, except in the case when a thyratron is used, the controlling member is a variable and controllable impedance, either connected in series with the load impedance (series control), which may for example consist of an electron tube or transistor circuit or some other load, usually with predominant resistive character, or connected in parallel with the load impedance (parallel control). A coupling in which control is carried out via an oscillator with controllable amplitude also occurs. In all these cases the control is carried out in such a manner that a comparing member compares the output voltage attained at the load impedance with a reference voltage, whereby the difference between these voltages is allowed to actuate the control member in such a direction that the said difference decreases. This mode of procedure is called "counter-coupling." The power for the desired voltage or current is usually derived from the A.C. mains via a transformer and an amplifier.

When a transductor is used as control member series control is usual. Then the transductor is connected at the A.C. current side and the impedance formed by the transductor is substantially reactive, and therefore there will be no great power losses. The maximum control frequency, by which is meant the highest frequency by which the control member can actuate the output voltage, is low in this case, usually much lower than the mains frequency. As a result thereof swift variations in the load current cannot be compensated by the control member, and therefore large capacitors must be connected parallel with the output voltage.

In the case when a thyratron is used, the latter usually operates as a controllable rectifier. The thyratron then forms a controllable contact which connects the alternating voltage under suitable phases of its usually sinusoidal-shaped course. Neither in this case are there any greater losses of power, owing to the small voltage drop over the thyratron. Also in this case, however, is the maximum control frequency low.

When electron tubes are used as control members the control is usually carried out at the D.C. current side. In this case both parallel control and series control may be used. When the impedance, in this case resistive, varies, also the effect over the latter will vary. In order to dissipate this effect tubes of considerable dimensions must often be used. The effect for which the tube shall be dimensioned is as a rule of the same magnitude as the useful derivable effect. The maximum control frequency is in this case low.

If transistors are used as control members, they can, owing to the low collector-emitter voltage at saturation be used in a similar way as in the case of the thyratron. The maximum control frequency will be approximately the same as when a thyratron is used.

Transistors can also be used in a similar way as in the case of the electron tubes. Also in the case of transistors there occur losses of power over the variable resistance formed by the transistor. Particularly in this case is this effect serious, as transistors do not endure high temperatures. For example the power transistors available on the market can only be loaded with a few watts. Thus, units intended for greater power, in which transistors are used as control means, must contain a number of parallel-connected transistors corresponding to the necessary output power.

The object of the invention is to reduce to a minimum the generation of effect over the control member in different control circuits.

The effect over the control member is equal to the product of the voltage across the member and the current flowing therethrough. The reduction of this effect and thus the heating of the member is according to the invention carried out in such a manner that during the time the voltage is high, the current is low and vice versa. This is the same as pulsing the current, that is, a coupling in which the current can assume only either of two values, i.e. zero or maximum value.

The invention will now be described with reference to the accompanying drawings.

Figure 1:
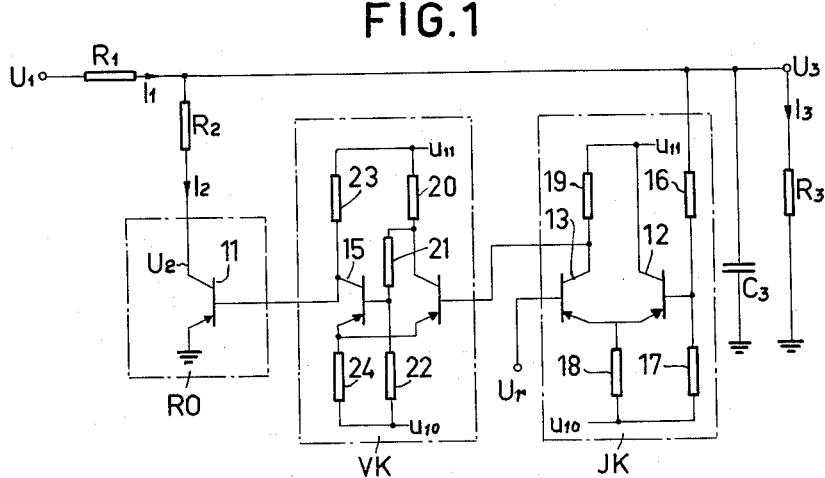
Fig. 1 illustrates a wiring diagram of a parallel-type regulator according to the present invention.
Figure 2:
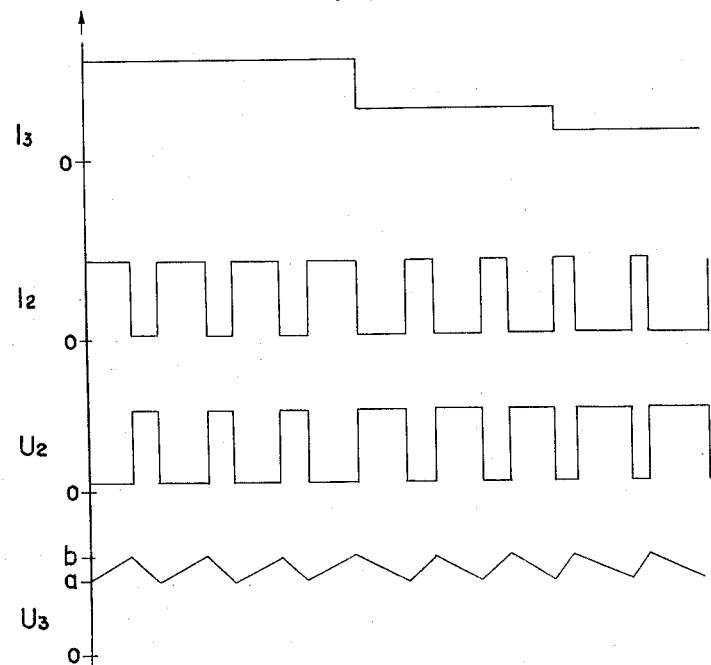
Fig. 2 is a characteristic diagram of the operation of the regulator of Fig. 1.

In Fig. 1 the invention is shown as applied to a parallel regulator with transistors. The regulation system has a D.-C. input voltage $U_1$ (which may be rectified from A.-C. power mains as mentioned above), and is adapted to maintain constant the output voltage $U_3$ at the load resistance $R_3$. The system includes a controllable control member RO, a multivibrator VK, and a comparing circuit JK to which is applied the reference voltage $U_r$. The resistor $R_2$ is connected in series with the control member in order to make the voltage over the control member low when the current is high. The multivibrator VK causes the control member RO to assume only one of two extreme positions, said multivibrator being operable by an error voltage produced by the comparing circuit JK and constituting the difference between the reference voltage $U_r$ and the controlled output tvoltage $U_3$. The capacitor $C_3$ serves to smooth the current peaks through the resistor $R_1$, so that the comparatively high frequency voltage variations of the controlled voltage $U_3$ are not too great. The device acts in the following manner: There is a certain load $R_3$. The current $I_2$ which is greater than $I_3$ charges the capacitor $C_3$ so that the output voltage $U_3$ increases (see Fig. 2). When the voltage $U_3$ increases sufficiently to develop an error voltage of a magnitude to cause multivibrator VK to oscillate, the current $I_2$ is switched on. The current $I_1$ is now smaller than the sum of the currents $I_2$ and $I_3$, and therefore the capacitor $C_3$ is discharged, whereby the voltage $U_3$ decreases. When the latter has decreased sufficiently, the multivibrator again oscillates, so that the current $I_2$ is switched off. Thus, variations in the current $I_3$ or the voltage $U_1$ will influence the relations between the "on period" and the "off period" of the current $I_2$ in such a direction that $U_3$ will maintain its value.

Figure 3:
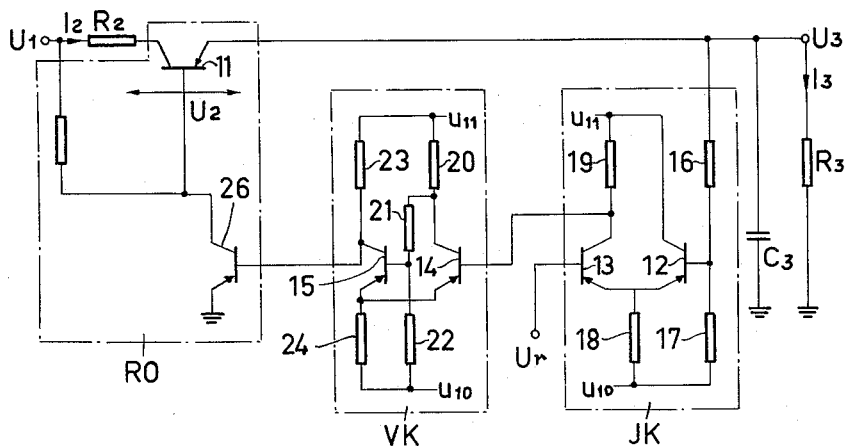
Fig. 3 is a wiring diagram of a series-type regulator according to the present invention.

In Fig. 3 the invention is shown as applied on a series regulator. The capacitor $C_3$ smooths the current peaks through the resistor $R_2$ and the control member. In this case the device acts in the following manner: There is a certain load $R_3$. The current $I_2$ which is greater than the current $I_3$ charges the capacitor $C_3$ whereby the voltage $U_3$ increases (see Fig. 2). When the voltage $U_3$ reaches a value to cause the multivibrator VK to oscillate, the current $I_2$ is switched off. Now the current $I_3$ discharges the capacitor $C_3$ whereby the voltage $U_3$ decreases. When the voltage $U_3$ decreases sufficiently, the current $I_2$ is switched on, whereafter the cycle is repeated. The saw-tooth-shaped voltage variations of the voltage $U_3$, as will be seen from Fig. 2, can be reduced to a minimum. The amplitude depends upon the magnitude of the capacitor $C_3$ and the gain of current in the circuit.

The invention can also be applied to the control of such voltages and currents to which the control member cannot be directly subjected. The conversion into suitable values is carried out in a transformer.

In such cases when the controlled current or voltage $U_3$ shall be able to change polarity, (that is, to be an A.C. current or an A.C. voltage) a combination may be used of the series and parallel regulators described above in order to obtain great efficiency.

Figure 4:
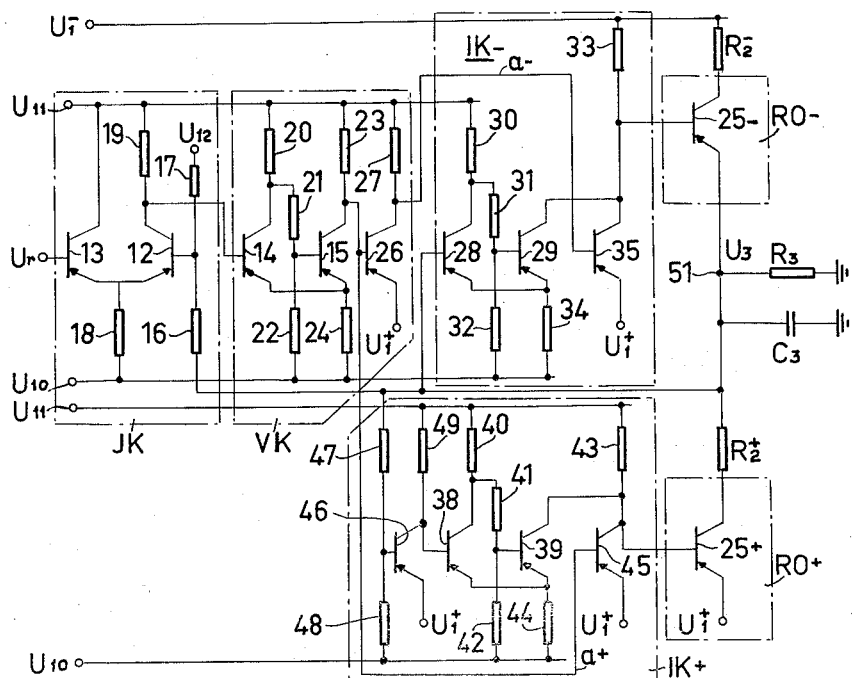
Fig. 4 is a wiring diagram of a combined series-parallel type regulator according to the invention.

Such a combination is shown in Fig. 4. The load $R_3$ is connected between ground and on one hand the unregulated negative supply $U_1^-$ through a first control member RO— and the impedance $R_2^-$ and on the other hand the unregulated positive supply $U_1^+$ through a second control member RO+ and the impedance $R_2^+$. The output voltage $U_3$ is in the same manner as is disclosed above applied to one input terminal of the comparator circuit JK, the other input of which is connected to the reference voltage $U_r$ which in this case is not a constant voltage but an alternating voltage having an arbitrary waveform (for example sinusoidal). The output of the comparator JK which is carrying the difference voltage between $U_r$ and $U_3$ is connected to the input of the bistable trigger circuit VK which is substantially of the same kind as is described before except for an additional phase splitting circuit. Thus the circuit VK has two outputs $a-$ and $a+$ which always have opposite polarities. The output $a-$ is connected to one output of the inhibitor circuit IK— while the other output $a+$ is connected to the inhibitor circuit IK+. Said inhibitor circuits have their control inputs connected to the output voltage $U_3$ and their outputs connected to the regulators RO— and RO+ respectively. The inhibitor circuits are so designed, that the regulator RO— is disconnected when the regulator RO+ shall conduct during the positive halfwave of $U_3$ and vice versa.

The comparator JK comprises two transistors 12 and 13 having a common emitter resistance 18 connected to the positive voltage $U_{10}$. The base of the transistor 13 is connected to the reference voltage $U_r$ while the collector is connected to the negative voltage $U_{11}$. The base of the transistor 12 is connected to the tap of the voltage divider 16, 17 connected between the negative voltage source $U_{12}$ and the output terminal 11. The collector of the transistor 19 is also connected to the base of the transistor 14 of the bistable trigger circuit VK. This transistor 14 forms together with the transistor 15 a Schmitt trigger. The emitters of the transistors 14 and 15 are through a common emitter resistance connected to the positive voltage source $U_{10}$ while the collectors are connected to the negative voltage source $U_{11}$ through the resistors 20 and 23 respectively. A voltage divider 21, 22 is connected between the collector of the transistor 14 and the voltage source $U_{10}$. The collector of the transistor 15 is connected both to the base of the phase inverting transistor 26 and to the base of the transistor 45 in the inhibitor circuit IK+. The emitter of the transistor 26 is connected to the voltage source $U_1^+$ while the collector is connected on one hand to the voltage source $U_{11}$ and on the other hand to the base of the transistor 35 in the inhibitor circuit IK—.

Each of the inhibitor circuits IK— and IK+ includes a Schmitt trigger which in the circuit IK— is built up to the two transistors 28 and 29. The emitters of both transistors are connected to the voltage source $U_{10}$ through the common resistance 34. The transistor 28 has the base connected to the output terminal 11 and the collector connected to the voltage source $U_{11}$ through the resistance 30. Between the collector and the voltage source $U_{10}$ is also connected a voltage divider 31, 32 the tap of which is connected to the base of the transistor 29. The collector of the last mentioned transistor is connected to the voltage source $U_1$ through the resistance 33 which also serves as a collector resistance for the transistor 35. The emitter of the transistor 35 is connected to the voltage source $U_1$ and the collector is connected besides to the junction between the collector of the transistor 35 and the resistance 33 to the base of the transistor 25 in the control member RO—. The emitter of the transistor 25 is connected to the output terminal 11, while the collector is connected to the unregulated voltage source $U_1^-$ through the impedance $R_2^-$.

The inhibitor circuit IK+ is equal to the circuit IK— except for a phase inverting transistor 46 preceding the Schmitt trigger. The elements which are identical with the corresponding elements in the inhibitor circuit IK— have the reference numbers with the same units digit but the tens digit is one unit higher. The inverting transistor 46 has the base connected to a tap on the voltage divider 47, 48 connected between the input terminal 11 and the voltage source $U_{10}$ the emitter connected to the voltage source $U_1^+$ and the collector connected on one hand to the voltage source $U_{11}$ through the resistance 49 and on the other hand to the base of the transistor 38. The collector of the transistor 45 is connected to the control circuit transistor 25+, the emitter of which is collected to the unregulated voltage supply $U_1^+$ and the collector of which is connected to the output terminal 11 through the impedance $R_2^+$.

Suppose that the reference voltage $U_r$ just at the moment is positive. This fact involves that the transistor 28 of IK— is cut off while the transistor 29 is conducting. The voltage drop across the resistance 33 is so great that the transistor 25— is cut off and the control circuit RO— is inactive. Owing to the phase reversing stage 46 the Schmitt trigger of the circuit IK+ is in such a state that the transistor 39 is non-conducting. The output voltage $U_3$ is compared with the reference voltage $U_r$ and the difference or error voltage is taken out from the collector of the transistor 12 and is applied to the trigger input of the Schmitt trigger 14, 15.

If $U_r$ is greater than $U_3$ the trigger will be set in a state with the transistor 15 conducting, but if $U_3$ is greater than $U_r$ the transistor 14 is made conducting while the transistor 15 is cut off. As has been stated earlier the transition between the two stable states takes place with some backlash. Thus, if $U_3$ is lower than $U_r$, the collector potential of the transistor 15 and thus the base potential of the transistor 45 is high and the transistor 45 is non-conducting. The transistor 25+ is thus conducting for supplying energy to the load and the storage capacitance $C_3$. If however $U_3$ is greater than $U_r$ the transistor 15 is cut off and its collector potential and thus the base potential of the transistor is low. The transistor 45 is now conducting and the voltage drop across the resistance 43 is sufficient to make the transistor 25+ non-conducting and the supply to the load is cut off.

Supposing now that the output voltage $U_3$ has a negative halfwave. The transistor 46 will conduct owing to the negative base potential and the Schmitt trigger 38, 39 in the inhibit circuit IK+ will be set to the state with the transistor 39 conducting. Thus the transistor 25+ will get a high base potential and the control device RO+ is non-operative. In the inhibitor circuit IK— the transistor 29 of the Schmitt trigger is cut off and no cut off bias is applied to the transistor 25—.

If $U_r$ is more negative than $U_3$ the collector of the transistor 12 of the comparator will get more negative and the Schmitt trigger of the circuit VK will assume the state with the transistor 14 conducting. The collector of the phase shifting transistor will get more positive and the transistor 35 is cut off. Thus the transistor 25 is kept conducting and the storage capacitor $C_3$ is charged in the negative direction.

If, however, $U_r$ is more positive than $U_3$ the Schmitt trigger will assume the state with the transistor 15 conducting causing the transistor 35 to conduct. The voltage drop across the resistance 33 is sufficient to bias the transistor 25— cut off and the storage condenser is discharged until $U_3$ has reached the level where the transistor 25— is made conducting again.

In order to prevent the time constant of the circuit $R_3$-$C_3$ from having a detrimental effect upon the zero passage speed of the voltage $U_3$, the operating points of the inhibiting circuits are so selected that both control members RO+ and RO— can operate simultaneously when the output voltage $U_3$ is near zero.

The embodiments described and shown in the drawings are only to be considered as examples and can be modified, with regard to details, in several ways within the scope of the claims.

What I claim is:

1. In an electrical control apparatus for generating from at least one unregulated input signal a controlled output signal following a reference signal, comprising at least one input terminal to which the input signal is applied, an output terminal from which the output signal is supplied, a load connected to said output terminal, a storage capacitance connected to said output terminal, at least one impedance connected between said input and output terminals, at least one control member for switching on and off a charging signal to said storage capacitance, a comparing device for comparing the signal at the output terminal with said reference signal to produce a difference signal, a bistable state device having the input connected to said comparing device and the output connected to said control member, said bistable state device being triggered to one stable state by difference signals higher than a predetermined value and to another stable state by difference signals lower than another predetermined value, the output signal of said bistable state device causing the control member to be made conducting when the bistable state device has one state and to be made non-conducting when the bistable state device has the other state in order to maintain the output signal on the reference level.

2. An electrical control apparatus for generating an output signal from an unregulated input signal, including an input terminal to which the input signal is applied, an output terminal from which the output signal is supplied, a load connected to said output terminal, a storage capacitor connected to said output terminal, an impedance, and a transistor switch connected in series between said output and input terminals, a comparing device for comparing the signal at the output terminal with said reference signal to produce a difference signal, a bistable state device having the input connected to said comparing device and the output connected to the control circuit of said transistor switch, said bistable state device having one stable state for difference signals higher than a predetermined value and another stable state for difference signals below another predetermined value, said bistable state device making the transistor switch conducting in one state and non-conducting in the other state to maintain the output signal on the reference signal level.

3. An electrical control apparatus for generating a signal following a reference signal from an unregulated input signal, including an input terminal to which the input signal is applied, an output terminal, a load for utilizing a controlled output signal taken out from said output terminal, a storage capacitor connected to said output terminal, an impedance connected between said input and output terminals, a transistor switch shunting said output terminal, a comparing device for comparing the signal at the output terminal with said reference signal to produce a difference signal, a bistable state device having the input connected to said comparing device and the output connected to the control circuit of said transistor switch, said bistable state device having one stable state for difference signals higher than a predetermined value and another stable state for difference signals below another predetermined value, said bistable state device making the transistor switch non-conducting in one state and conducting in the other state causing the storage capacitance to be charged when non-conducting and to be discharged when conducting in order to keep the output signal on the reference signal level.

4. An apparatus as defined in claim 1 wherein said bistable state trigger is a Schmitt trigger.

5. An electrical control apparatus for generating an A.C.-signal following a reference A.C-signal from one positive and one negative unregulated D.C-signal supply including a first input terminal to which the positive D.C.-signal is applied, a second input terminal to which the negative D.C.-signal is applied, an output terminal, a load connected to the output terminal, a storage capacitance connected to the output terminal, impedances connected between each of the input terminals and the output terminal, two control members for alternately switching on and off a positive or negative charging D.C.-signal to said storage capacitance, a comparing device for comparing the instantaneous value of the output signal with the instantaneous value of the reference signal to produce a difference signal, a bistable state device having the input connected to said comparing device and the output connected to said control members and inhibiting circuit means for alternately making said control members non-operative in dependence of the polarity of the output signal, said bistable state device being triggered to one stable state for difference signals higher than a predetermined value and to the other stable state when the difference signal is lower than another predetermined value, the output signal of said bistable state causing the still operative control member to be made conducting when the bistable state device has one state and to be made non-conducting when the bistable state device has the other state in order to maintain the output signal on the reference level.

References Cited in the file of this patent

UNITED STATES PATENTS

| 2,776,382 | Jensen | Jan. 1, 1957 |
| 2,810,105 | Henrich | Oct. 15, 1957 |

FOREIGN PATENTS

| 1,116,650 | France | Feb. 6, 1956 |